June 11, 1963    A. J. VAN BUUREN    3,093,144
TOBACCO SMOKE FILTER
Filed July 12, 1960
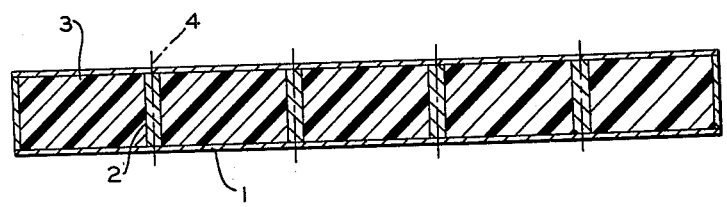
INVENTOR.
AREND JACOB VAN BUUREN
BY Arthur H. Seidel
ATTORNEY

3,093,144
TOBACCO SMOKE FILTER
Arend Jacob van Buuren, Weesperzijde 10,
Amsterdam, Netherlands
Filed July 12, 1960, Ser. No. 42,307
3 Claims. (Cl. 131—208)

The invention relates to a tobacco smoke filter, and more in particular to a tobacco smoke filter comprising an ion exchange resin including aromatic groups and having a grain size of not more than 1 mm. as a filter material.

Tobacco smoke filters are inserted in the tip of a cigarette, in a cigar or cigarette holder, or in a pipe in order to retain those constituents of the tobacco smoke that are harmful to the human body. The most important harmful constituents are nicotine, and the tarry products formed by the burning of the tobacco, which contain carcinogeneous substances, such as benzpyrene.

The conventional smoke filters are generally made of paper or acetate cellulose. In principle, such cellulosic filters can only have a slight effect, since the filter material has no chemical affinity to the substances to be eliminated. Thus, such substances can only be absorbed by the fibrous filter material in so far as they appear in the form of drops, either because they are liquid themselves, or because they are solved or suspended in water. However, the tobacco itself also operates as a filter for the liquid particles, so that the smoke is relatively dry during a substantial part of the burning process.

The negligible effect of cellulosic filters was confirmed by experiments in which two different brands of cigarettes with paper filters were tested. The following figures were found for the nicotine and tar contents in milligrams per cigarette:

Specimen A: with filter 0.48 mg. of nicotine and 54.8 mg. of tar; without filter 0.52 mg. of nicotine and 57.0 mg. of tar.

Specimen B: with filter 0.46 mg. of nicotine and 57.0 mg. of tar; without filter 0.62 mg. of nicotine and 61.8 mg. of tar.

In order to improve the filter action, it has been proposed to use a finely divided ion exchange resin having a grain size of 0.3 to 1.2 mm. as a filter material. This proposition was based on the idea to bind the nicotine to a cation exchanger in its active, hydrogen exchanging condition. In order to bind the acid constituents of the smoke, a finely divided anion exchanger in its active condition may be added to the cation exchanger. Some of the proposed ion exchange resins comprise aromatic groups.

However, the use of active ion exchange resins has an important disadvantage that the filter material cannot be enclosed in a paper envelope, since cellulosic materials are decomposed under certain conditions by the exchange resins; this decomposition occurs slowly when the cellulosic material is dry, and rapidly when it is wet. Furthermore, the active ion exchangers may influence the pH at the tip of the tongue or at the lips, so as to spoil the taste of the smoke.

A further disadvantage of many ion exchange resins is that they are strongly hygroscopic. This is another reason why no paper envelope can be used for the filter material, since the same would attract so much moisture during storage that the paper would be wetted and lose its strength. The water absorption by the filter material is accompanied by a swelling of the filter grains whereby the initial space between the grains is reduced to such an extent that the resistance offered to the smoke increases to an inadmissible value; in some cases, the filter is even completely clogged up.

It is an object of the invention to remove the disadvantages of the known filters, and to provide a filter material having a high retention for nicotine and for the tarry constituents of tobacco smoke which is adapted to be enclosed in a paper envelope.

Another object of the invention is to provide a smoke filtering material which does not give rise to a clogging of the filter or to an unduly high resistance.

A further object of the invention is to provide a filter rod adapted to be processed in a conventional cigarette machine and containing a finely grained ion exchange resin as a filter material.

According to the invention, the filter material is an ion exchange resin in its inactive or neutral condition having a volume increase of less than 60% upon exposure to water.

The invention is based on the recognition of the fact that ion exchange resins containing aromatic groups are capable, due to the similar chemical structure, to bind nicotine and the tarry constituents of tobacco smoke even in their inactive condition. In fact, a very considerable absorption of tar and nicotine by inactive ion exchange resins is found to occur, due to the fact that the said harmful constituents are dissolved in the resin or bound thereto by surface active forces. This effect occurs in a similar manner for cation and anion exchangers, so that both kinds of ion exchange resins may be used in the filter according to the invention. The essential properties to be considered in the selection of the resin are the volume increase upon exposure to water, and the hygroscopic action. It has been found that these two phenomena are correlated to such an extent that the volume increase may be used as a criterium for the usefulness of the resin as a filter material. A volume increase of 60% was found to be the upper limit.

In this connection, it is pointed out that the volume increase upon exposure to water is much larger for aliphatic than for aromatic resins. Thus, even if aliphatic resins would be capable of binding tar and nicotine due to a suitable chemical structure, they would generally be useless in a tobacco smoke filter due to an excessive swelling, and to the associated strong hygroscopicity.

Very favourable from the point of view of swelling and hygroscopicity are those aromatic resins in which the aromatic radicals are interconnected by short links; thus, resins of this kind are preferably used.

Filter materials which were found to give excellent results are:

(a) a condensate of metaphenylene diamine and formaldehyde, neutralised with nitric acid;

(b) a condensate of phenolmethylene sulfonic acid, neutralised with an alkaline or earth alkaline lye.

Preferably, the pH is adjusted to a value between 7 and 9.

The filter material according to the invention may be enclosed in a paper envelope without any disadvantage. It will be understood that the use of paper envelopes is widely used for cigarette filters, and very useful for filters to be used in pipes and cigar or cigarette holders in view of the low costs.

The grain size of the filter materials is determined by the conditions that the grains must be small enough to provide for a large effective contact surface with the tobacco smoke, but not so small that an excessive resistance is offered to the smoke. The maximum pull to be exerted by the smoker without undue difficulty corresponds to a water head of about 3.5 mm.; thus, the pull required to overcome the filter resistance may not exceed this value. This condition may be satisfied by using grains with a diameter of less than 1 mm. For filters to be used in cigarette tips, having a maximum length of about 11 mm. and a maximum diameter of 7-8 mm. in view of the dimensions of the conventional cigarette machines, good results are obtained with resin grains passing through a sieve with meshes of 0.3 to 0.42 mm. For filters to be used in a pipe, or in a cigar or cigarette holder, having a maximum length of about 40 mm. and a maximum diameter of 7-8 mm., good results are obtained with resin grains passing through a sieve with meshes of 0.42 to 0.71 mm.

The following table shows the volume increase upon exposure to water for several synthetic resins, having a grain size of not more than 0.3 mm. The resins were adjusted to a pH between 7 and 9; for the anion exchangers, this was done by means of hydrochloric or nitric acid, as indicated, for the cation exchangers by means of caustic soda.

Resin:  Volume increase in percent
(A) condensate of metaphenylene diamine and formaldehyde, neutralised with HCl_____ 62.5
(B) condensate of metaphenylene diamine and formaldehyde, neutralised with $HNO_3$_____ 12.7
(C) condensate of phenolmethylene sulfonic acid _____ 21
(D) condensate of phenylsulfonic acid and formaldehyde _____ 55
(E) polyethylene diamine_____ 82.5
(F) Lewatit MIH (a weakly basic anion exchanger of purely aliphatic character)_____ 119
(G) Amberlite A410 (anion exchanger on the base of styrene and quaternary ammonium bases) _____ 63.5

The resistance to tobacco smoke of all the above-mentioned resins was tested in a filter cartridge having a length of 7 mm. Resins B and C gave excellent results, resins A and D were at the limit of usefulness, and all the other resins were useless, in particular since the filters clogged up during smoking. This confirms the fact that the usefulness of the filter material is determined by the volume increase upon exposure to water.

The tar and nicotine retention was determined for a filter cartridge filled with resin B. Two tests were made for the tar retention, to wit a test in which the tar was dried at a temperature of 100-105° C. during 15 minutes, and a test in which the tar was dried at the same temperature during three hours; these tests are indicated hereinafter by "short" and "long." The following results were obtained:

TAR RETENTION

| Specimen | mg. of tar per g. of tobacco | | retention percent | |
|---|---|---|---|---|
| | short | long | short | long |
| without filter | 64.7 | 51.7 | 0 | 0 |
| with filter (1) | 29.8 | 16.5 | 54 | 68 |
| with filter (2) | 30.1 | 17.7 | 53 | 66 |

NICOTINE RETENTION

| Specimen | mg. of nicotine per g. of tobacco | retention (percent) |
|---|---|---|
| without filter | 2.9 | 0 |
| with filter (1) | 0.52 | 82 |
| with filter (2) | 0.33 | 88 |

It appears from this table that an excellent filter action is obtained, both for tar and nicotine.

The question arises how the filter material according to the invention may be used in practice in a cigarette filter.

The conventional cellulosic filters are produced in the form of rods having about the length of a normal cigarette. In the cigarette machine, this rod is divided into five or six pieces which are each attached to a cigarette to form a filter. It has been found that the filter material according to the invention may also be incorporated in a filter rod adapted to be processed in a cigarette machine in the same manner as a cellulosic filter rod. The filter rod according to the invention comprises a hollow cylinder divided into a plurality of chambers each filled with the filter material by means of partitions made of a sliceable material permeable to the tobacco smoke and spaced at distances corresponding to the length of a conventional cigarette filter. In the cigarette machine, this filter rod is divided into pieces along severing planes each extending through one of the partitions. For this purpose, the thickness of the partitions must be chosen in such manner that each of the parts into which the partition is divided by the cutting operation continues to seal the adjacent chamber so as to prevent the filter material from falling out. Of course, the tolerances allowed for the severing planes must be taken into account in determining the thickness of the partitions.

The material of the partitions must be readily sliceable, permeable for the smoke without undue resistance, and adapted to retain the filter material. In order to satisfy these conditions, it is preferred to make use, to form the partitions, of discs sliced from a conventional cellulosic filer rod.

The accompanying drawing shows a preferred embodiment of such a filter rod.

The filter rod as shown comprises a hollow cylinder 1, preferably made of paper. This cylinder is closed at its ends, and divided into a plurality of chambers, by means of partitions 2. The partitions fit exactly in the cylinder and have been produced by slicing a conventional cellulosic filter rod. The chamber between the partitions are each filled with a finely divided ion exchange resin 3, as specified hereinbefore. In the cigarette machine, the filter rod is cut through along the planes indicated by the dotted lines 4, whereby each filter rod is divided into five filters which are each attached to a cigarette.

Although the invention has been described hereinbefore by reference to specific examples, it is to be understood that many modifications and alterations of these examples are possible within the scope of the invention as set forth in the claims.

I claim:
1. In a smoking article, a tobacco smoke filter comprising a paper cartridge permeable to the smoke at both ends and filled with a finely divided resin selected from the group consisting of a condensate of phenolmethylene sulfonic acid having a pH between 7 and 9 and a condensate of metaphenylene diamine and formaldehyde having a pH between 7 and 9, said resin having a grain size of not more than 1 mm. and a volume increase of less than sixty percent upon exposure to water.

2. In a smoking article according to claim 1, in which said finely divided resin is a condensate of metaphenylene diamine and formaldehyde having a pH between 7 and 9.

3. In a smoking article in accordance with claim 1, in which said finely divided resin is a condensate of phenolmethylene sulfonic acid having a pH between 7 and 9.

References Cited in the file of this patent

UNITED STATES PATENTS

| 2,754,829 | Hess | July 17, 1956 |
| 2,798,850 | Voightman et al. | July 9, 1957 |
| 2,800,908 | Blank | July 30, 1957 |
| 2,820,460 | Bunzl et al. | Jan. 21, 1958 |

FOREIGN PATENTS

| 1,068,521 | France | Feb. 3, 1954 |
| 879,823 | Germany | June 15, 1953 |

OTHER REFERENCES

Kunin and Meyers: "Ion Exchange Resins" text published by John Wiley & Sons, N.Y., 1950, 212 pages, pages 6 to 28, inclusive, especially cited.